United States Patent [19]

Nevel et al.

[11] Patent Number: 5,570,188
[45] Date of Patent: *Oct. 29, 1996

[54] SYSTEM AND METHOD FOR ELECTRONICALLY DISPLAYING YARN QUALITIES

[75] Inventors: Avishai Nevel; John B. Lawson, both of Providence; Kendall W. Gordon, Jr., North Kingstown, all of R.I.; David Bonneau, West Boylston, Mass.

[73] Assignee: Lawson-Hemphill, Inc.

[*] Notice: The term of this patent shall not extend beyond the expiration date of Pat. No. 5,541,734.

[21] Appl. No.: 252,346

[22] Filed: Jun. 1, 1994

(Under 37 CFR 1.47)

Related U.S. Application Data

[63] Continuation-in-part of Ser. No. 150,613, Nov. 10, 1993, abandoned.

[51] Int. Cl.⁶ .................................................. G01B 11/10
[52] U.S. Cl. ..................... 356/385; 250/559.24; 356/238; 356/430
[58] Field of Search ..................................... 356/384, 385, 356/386, 387, 245, 429, 430, 431, 238; 250/559.24; 348/88, 91, 92, 93, 135

[56] References Cited

U.S. PATENT DOCUMENTS

| | | | |
|---|---|---|---|
| 4,764,876 | 8/1988 | Whitener, Jr. et al. | 356/430 |
| 4,887,155 | 12/1989 | Massen | 348/88 |
| 4,963,757 | 10/1990 | Liefde et al. | 356/429 |
| 4,984,181 | 1/1991 | Kliman et al. | 364/518 |
| 5,319,578 | 6/1994 | Lawson et al. | 250/559.24 |

*Primary Examiner*—F. L. Evans
*Attorney, Agent, or Firm*—Brian M. Dingman

[57] ABSTRACT

A system and method for electronically comparing yarn lengths to assist in grading yarn qualities, in which the yarn diameter or another yarn quality at a number of locations along the total length of the yarn is measured, and representations of the measured qualities are displayed to allow comparison of portions of the yarn.

16 Claims, 3 Drawing Sheets

SYSTEM AND METHOD FOR ELECTRONICALLY DISPLAYING YARN QUALITIES

RELATED APPLICATION

This application is a continuation in part of application Ser. No. 08/150,613, filed Nov. 10, 1993 now abandoned.

FIELD OF INVENTION

This invention relates to a system and method for rapidly and electronically scanning a long length of yarn, and displaying measured attributes of a large number of selected lengths of the stored information side-by-side to assist in grading yarn regularity or appearance.

BACKGROUND OF INVENTION

There are numerous quality control tests for yarns. One such test is for the yarn general appearance. This test is accomplished by winding the yarn onto a rectangular or trapezoidal-shaped black board to allow the side-by-side comparison of half of the yarn sample as a number of relatively short lengths of yarn. This test has been standardized as ASTM D2255-64. The method describes winding the yarn on a rectangular or tapered board. The board covered with the wound yarn is then examined and a visual appraisal of appearance is made that takes into account slubs, hairiness, thick and thin places, broken ends, filaments and other novelty effects. Boards of standard yarns of known commercial quality may be wound and photographed for use as standards. Quantitative estimates of regularity may be made by counting the number of faulty places and expressing these as a percentage of the number of turns of yarn on the board.

This method has been used successfully for years for grading yarns. However, the method is relatively slow, inaccurate, labor intensive, and highly judgmental and thus expensive. The process requires an operator to wind the yarn on the board before the comparison can be made, and it also requires the assessment of a number (generally 5) of independent inspectors. Further, only half of the yarn can be viewed, which decreases the likelihood of faults being detected.

SUMMARY OF INVENTION

It is therefore an object of this invention to provide a system and method for electronically displaying one or more measured attributes of a large number of yarn lengths to allow determination of the yarn quality.

It is a further object of this invention to provide such a system and method that is less expensive to accomplish than the manual system.

It is a further object of this invention to provide such a system and method that is quicker than the manual system.

It is a further object of this invention to provide such a system and method that allows the grading of greater quantity of yarn cones than is currently accomplished.

It is a further object of this invention to eliminate human judgment and replace it with electronic quantifiable gradings of yarn.

This invention results from the realization that the yarn comparison test for general yarn regularity may be accomplished electronically by scanning a long length of yarn and displaying the long length of yarn as a number of side-by-side shorter lengths of yarn to create an electronic version of the manual inspection board currently in use, and by representing different measured yarn qualities with display attributes such as display line width, shades of grey, or colors to allow the visual comparison of yarn lengths as done with the manual inspection board, and also allow electronic gradings and actual counts of faults or events in the yarn.

This invention features a system for electronically comparing yarn lengths to assist in grading yarn appearance quality. In one embodiment the system includes means for determining the yarn diameter at a number of locations along a length of yarn, and means for displaying representations of the diameters of the yarn to allow comparison of portions of the yarn.

The yarn diameters may be determined with a light source for shining light on the yarn in a yarn measurement zone, and a light receiving means such as a CCD array which may be a linear array for receiving light passed by the yarn. In the embodiment in which the light receiving means is an array of small light receiving elements, the means for determining the yarn diameter may further include means for determining which array elements have not received light from the light source. The means for determining the yarn diameter may further include means for determining the farthest-spaced pair of light receiving elements that have not received light as indicative of the yarn diameter.

The system may further include means for dividing the diameters into a plurality of groups, each group representing a portion of the length of the yarn. In that case, the groups of diameters may be adjacent so that the portion of the yarn measured is continuous. The means for displaying the representations may then include means for displaying the representations of the groups side-by-side to facilitate comparison. The groups may represent yarn portions of the same or different lengths depending on whether a rectangular or trapezoidal (tapered) display is desired.

The means for displaying the representations of the diameters may include means for assigning different display attributes to different yarn diameters. The display attributes may include different grey values for a monochrome display, or different colors for a color display. The means for displaying the attributes may include a video display.

The system may further include means for establishing minimum and/or maximum yarn width and length thresholds to define one or more yarn events (yarn portions of more or less than a certain diameter continuously for at least, or less than, a certain length). Events may be displayed as short line segments, and may also be counted and tabulated. The remainder of the length of yarn may not be displayed, to create a display of spaced line segments which facilitates recognition of event regularity.

In a more specific embodiment, this invention features a system for electronically comparing yarn lengths to assist in grading yarn quality which includes a light source for providing light to a yarn measurement zone, means for moving yarn through the measurement zone, and a linear array of light-sensing elements for receiving light passed by the yarn. There are means for determining the yarn diameter at a number of closely-spaced locations along a length of yarn, and means for dividing the diameters into a plurality of groups each representing a portion of a length of yarn. There are means for assigning different display attributes to different yarn diameters, and means for displaying the attributes of the yarn portions side-by-side on a video display to allow comparison of the yarn portions.

In another embodiment this invention features a system and method for electronically displaying at least one yarn quality by measuring, at a plurality of locations along a length of yarn, at least one measurable yarn quality, assigning a display attribute to each measured quality, dividing the display attributes to a number of groups each representing a portion of length of yarn, and displaying the display attributes of the groups side-by-side to facilitate comparison of the quality in the groups. The display may be accomplished on a CRT. The display attribute may be, for example, a line segment, the display color, the display grey scale, or a display symbol such as a alphanumeric character or other symbol. The measured quality may be any measurable quality of yarn, for example, diameter, mass, tension on the yarn, hairiness, color, shrinkage, twist, and entanglements. This invention is meant to cover the claimed type of display for any of these or other measurable values of yarn which can be measured either discretely or continuously along a length of yarn.

In the example in which the measured quality is diameter, this invention may further include means for establishing a yarn width threshold, and comparing the measured diameters to that threshold. There may then be further included means for establishing a yarn length threshold, and means for establishing the existence of an event when the yarn width exceeds or is less than the width threshold for at least or less than the threshold length. In this case, the display attribute may be a line segment displayed for events. The line segment may have a fixed length regardless of the length of the event, and the operator may be provided the ability to select that length. Alternatively, the length of the line can be related to the length of the event by including means for determining the length of yarn sub-portions in which the yarn width exceeds the width threshold as long as the length is at least equal to the length threshold.

There may further be included means for counting the number of display attributes. The means for measuring the measurable yarn quality may measure at least two different yarn qualities, in which case the means for assigning display attributes may include means for providing a different display attribute for each measured yarn quality.

BRIEF DESCRIPTION OF THE DRAWINGS

Other objects, features and advantages will occur to those skilled in the art from the following description of a preferred embodiment and the accompanying drawings in which.

DESCRIPTION OF THE PREFERRED EMBODIMENT

Figure 1:
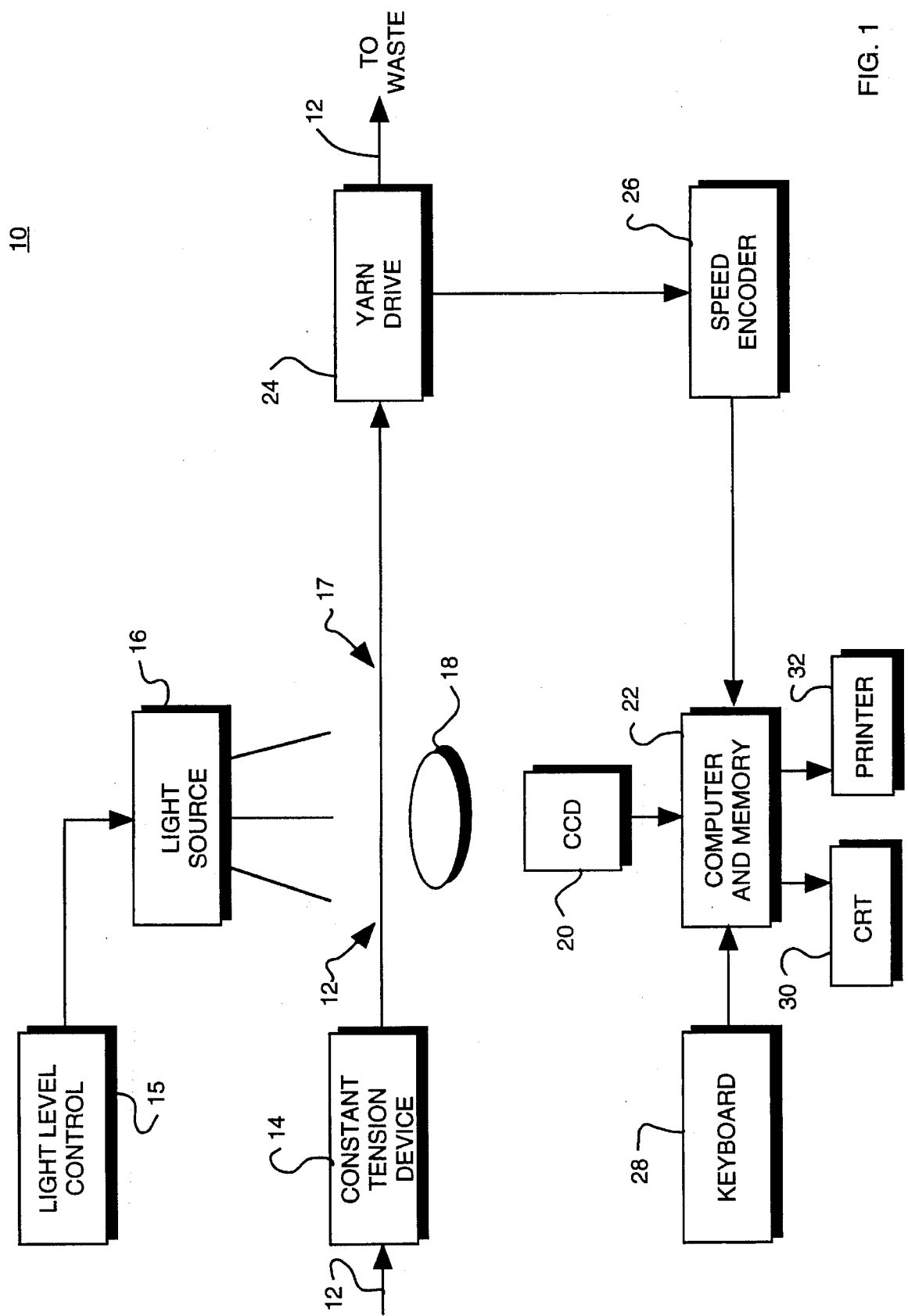
FIG. 1 is a schematic diagram of yarn profile imaging device useful in accomplishing this invention.

This invention may be accomplished in a system for electronically comparing yarn portions to assist in determining yarn quality. The system measures one or more qualities, such as the yarn diameter, at a large number of closely spaced locations along a length of yarn. Diameter measurement may be accomplished with an electronic sensor which may include a linear CCD array and a light source for shining a light into a measurement zone through which the yarn is moved. The CCD captures a shadow image of the yarn. The system then determines the yarn diameter. The diameter in one embodiment is based on the farthest-spaced pair of the CCD pixels that do not receive light so that the yarn diameter measurement includes measurement of hairs, slubs and other thick spots in the yarn. Alternatively, diameter can be measured in more traditional manners, for example by summing the closed or blocked pixels of the CCD array.

These yarn quality measurements are then divided into a number of groups of measurements representing adjacent, shorter lengths of yarn. A display attribute is then assigned to each measured quality, and then the attribute or attributes for each of the sub-lengths are displayed side-by-side to mimic the manual inspection or taper board. The display lines representing the yarn could be non-horizontal. For example, the lines could be generally sinusoidal to mimic the appearance of the yarn after knitting.

For diameter measurement, the attribute may be a black line whose width is directly related to the measured diameter so that the appearance is similar to that of the shadow of a yarn, in which case the yarn diameter may be represented by the width of the black line. This would be particularly useful if the operator wanted to zoom in on a section of yarn. Alternatively, the line representations could be of constant width, for example one or more raster scan lines of the CRT display, and the yarn width may be represented using grey scale or color. In one embodiment, each diameter measurement may be converted to an 8-bit scale, and each corresponding display pixel may have a grey-scale value of between 0 and 255 to accomplish a grey-scale representation of width. Alternatively, different diameter ranges may be represented by different shades of grey or colors as desired to accomplish a system that facilitates the determination of yarn quality by the operator.

In another alternative embodiment, the measurement system can determine the locations of yarn events, which are pre-defined by the operator. An example of an event would be at least a specified yarn width continuously for at least a specified length, for example for measuring balloons in entangled yarns. Each event could then be represented in the display by a short line segment of fixed length, or with a length related to the event length. A second value could be represented in the same display. For example, colors could be assigned to various yarn width ranges, and the display line segments could be assigned colors based on the actual yarn widths. The remaining portions of the yarn in this case would not be displayed, resulting in a series of spaced monochrome or colored line segments on the display screen. Repetitive events would be discernible by patterns in the display, just as they would be in a traditional taper board.

One advantage of the system and method of this invention is that representations of one or more measured values of an extremely long length of yarn may be displayed on a monitor screen to allow the visual comparison of a number of sub-lengths of the yarn length. The system allows all of the yarn to be displayed, unlike with the traditional taper board, in which only half of the yarn is displayed. This display allows the operator to better discern repetitive or random events. For example, when yarn hairiness or diameter is measured and displayed in some manner, these representations can give the operator an idea of the coverage factor of the yarn.

This invention is not meant to be limited to any particular one or more measurable values of yarn, as it is meant to encompass any yarn quality which may be measured. Among those which may currently be measured, and thus represented by a display attribute of this invention, are the following: Yarn mass, which may be measured by capacitance, for example. Yarn diameter, which is treated in detail below as one value which may be measured optically, either digitally or with an analog system. Tension, which may be measured with a tensiometer. Hairiness, which may be measured optically. Color, which may be measured with a colorimeter. Shrinkage, which may be measured with the TYT available from Lawson-Hemphill, Inc., Central Falls, Rhode Island. Entanglements, which may be measured optically. And twist, which may be measured optically.

For a monitor display, such as a CRT, the following types of display attributes are contemplated, although this invention is not limited to these particular display attributes: Line segments may be used to represent measured values. The length and/or width of such line segments may be used to represent measured values. Color may be used to represent measured values. Grey scale may be used to represent measured values. Display symbols such as alpha numeric or other symbol shapes may be used to represent measured values.

There is shown in FIG. 1 yarn profile measurement system 10 useful in the system of this invention. Yarn measurement system 10 accomplishes the yarn diameter measurements and display of the representations of the diameters to assist the operator in determining yarn quality. Analyzer 10 is used to make width measurements of yarn 12 moved through imaging area 17 by yarn drive 24. Yarn 12 may pass through constant tension device 14 before entering imaging area 17 so that it may be held under a constant, reproducible tension while being imaged. Precision control of the yarn speed is accomplished with yarn drive 24 so that the yarn may be passed through imaging area 17 at a constant, reproducible speed. This speed and tension control provides the ability of device 10 to develop useful, accurate, quantitative data concerning each unit of yarn under test.

Light source 16 provides light in imaging area 17 that is focussed by lens 18 onto linear CCD array 20 to create an image sharp enough for the desired purposes. Light level control 15 allows operator control of the light output level of light source 16. Preferably, light source 16 is an incandescent lamp, and control 15 is regulated DC lamp power supply with variable output to provide a steady light source without 60 Hz flicker that has a variable light-level output so that the operator may regulate the amount of light received by the CCD pixels that is considered to be a blocked pixel. The amount of light sensed by each pixel of array 20 is provided as a related analog voltage at the output of array 20. This level can be compared to an adjustable, operator established threshold level in computer 22 so that the device reports a blocked or unlighted pixel only when the selected percent of the maximum possible incident light actually received is below the selected threshold level. This threshold and light level flexibility allows the operator to either emphasize or filter out specific details of a yarn such as hairiness.

Speed encoder 26 is preferably used to measure the lengths of yarn transported by drive mechanism 24. The output of encoder 26 is then translated into yarn lengths and yarn speed by computer 22. Keyboard 28 is used by the operator to enter commands for operation for computer 22 in a known fashion. The output of the device may then be applied to either CRT 30 and/or printer 32 as desired.

Figure 2:
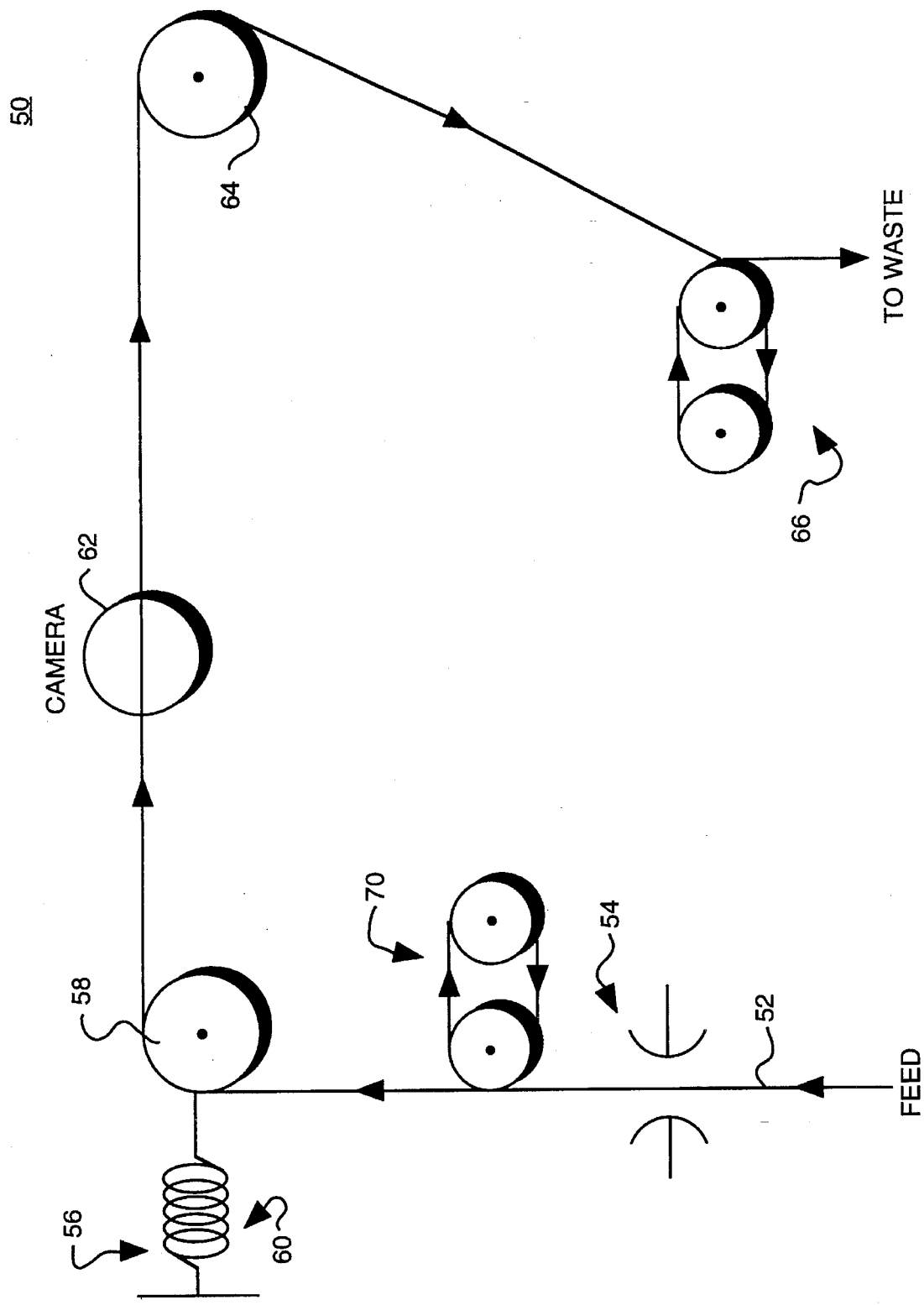
FIG. 2 is a highly schematic view of a preferred embodiment of the device of FIG. 1.

Embodiment 50 of the yarn diameter measurement system useful in this invention is shown schematically in FIG. 2. Yarn 52 is passed through pretension device 54, around a first set of feed rolls 70, and then through constant tension device 56 schematically depicted as roller 58 and adjustable tension spring 60. Device 56 preferably allows the operator to select the tension applied to yarn 52 from ½ to 750 grams. Camera 62 images the yarn and provides the image to the computer. In a preferred embodiment, the linear CCD array described above is employed and operated at about 3,200 scans per second with the yarn diameters measured and stored for selected lengths of yarn with the yarn running at selected speeds. This is accomplished with a clock running at approximately 15 MHz. The yarn is then directed by roller 64 to driven roll pairs 66 around which yarn 52 is wound one or more times to pull the yarn through camera 62. The embodiments of FIGS. 1 and 2 are described in more detail in copending application Ser. Nos. 07/950,830, filed Sep. 24, 1992, and 08/107,968, filed Aug. 17, 1993, both incorporated herein by reference.

Figure 3:
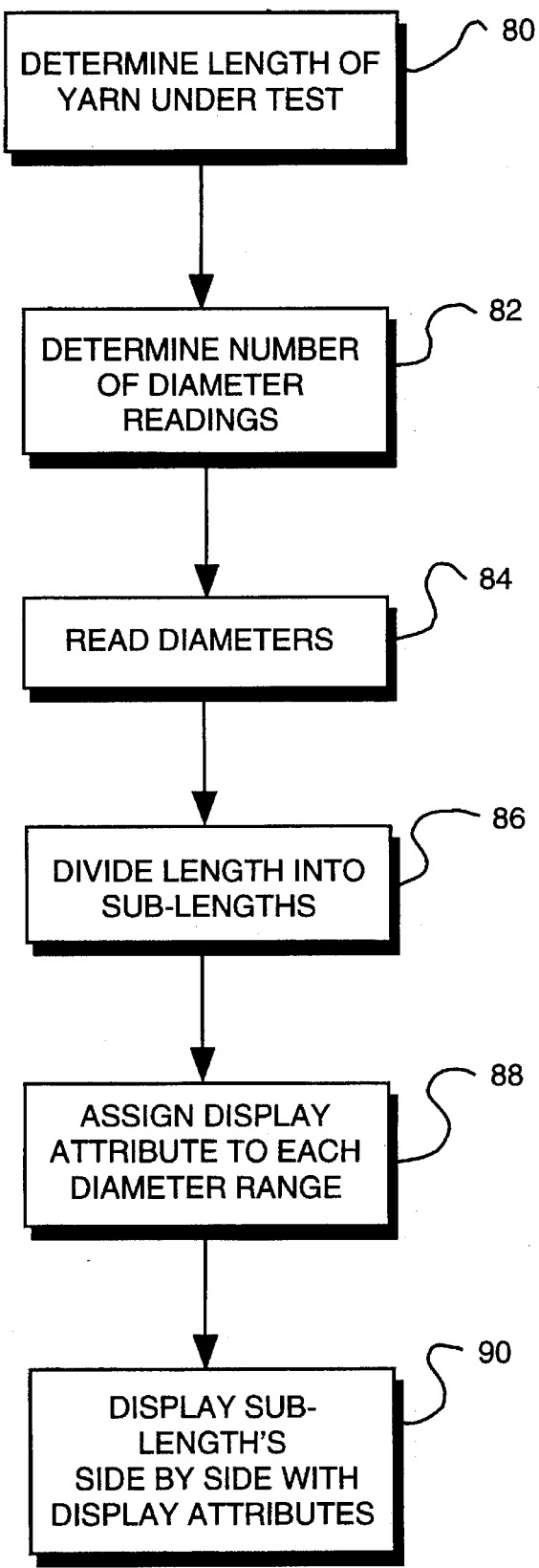
FIG. 3 is a block diagram of the operation of the device of FIG. 1 according to a preferred embodiment of this invention.

A flow chart for operation of a preferred embodiment of the system of this invention, using the equipment shown in FIGS. 1 and 2 in which the measured quality is yarn diameter, is shown in FIG. 3. The system first determines the length of yarn under test, preferably under operator control. Then the system determines the number of diameter readings to take for that length. The maximum number would be set either by the amount of available memory or the yarn speed and length under test versus the measurement device clock speed, which would determine the number of measurements taken per unit length. For a standard CRT display with 640 pixels on each of 480 raster scan lines, the system could handle up to 307,200 scans in a situation in which one screen pixel would represent one diameter scan. In that case, the measured diameters could be converted into an 8-bit value, and each CRT pixel could be assigned a shade between 0 and 255 to represent the diameters with a grey scale image.

The system reads the diameters, step 84, by moving the yarn through the imaging area as shown in FIGS. 1 and 2. In a preferred embodiment, the diameter is calculated based on the two farthest-spaced pixels of the CCD array which are considered to be blocked by the yarn, regardless of any intervening unblocked pixels, so that, for example, hairiness is measured as contributing to the overall diameter of the yarn. By adjusting the amount of received light which is considered to represent a blocked pixel, the operator may in effect filter out or emphasize such hairiness or other less dense yarn areas as desired.

The system then divides the measured length of yarn into a number of sub-lengths for display, step 86. For the case described above in which there are 640 measurements on each of 480 raster scan lines, the total of 307,200 scans would be divided into 480 adjacent groups of 640 scans each. Thus, an extremely long length of yarn may be represented in a single display screen. The system then assigns display attributes to each diameter or diameter range, step 88. This may be accomplished as described above for a grey scale image. Alternatively, fewer shades of grey, or colors, may be used. In any case, each diameter or each diameter range as established by the operator is assigned a different display attribute, such as color or shade of grey. Every one, or some of, the sub-lengths are then displayed side-by-side, with those display attributes, step 90, to accomplish an electronic version of the standard inspection board or taper board used for determining the general regularity of the yarn as set forth in the ASTM standard.

To represent the taper board, in step 86 where the measured length is divided into sub-lengths, the sub-lengths would be decreasingly shorter to accomplish a display that was trapezoidal in shape. Other shapes could obviously be chosen. Unlike the traditional taper board, the display of this invention can display all of a length of measured yarn, which increases the likelihood of finding faults present in the yarn. Further, because of the taper of the traditional taper board, there is only a short length of sample at any particular fault frequency. A greater length at any given frequency may be displayed by the system and method of this invention because the width of the display, and thus the length of each portion of yarn displayed, can be chosen as desired. This would allow the computer to be used to perform an analysis of faults or events present in the yarn, for example by performing a Fourier analysis on the measurements to determine the length frequency or frequencies at which significant faults are found, and then the display may be adapted at or around this frequency to display a greater length of yarn at that frequency for better visual analysis of the faults.

This invention can also be used to simulate the effect of a yarn clearer on the measured yarn. This effect can be accomplished by not displaying portions which would be cut out by a clearing device.

In another alternative embodiment, the yarn diameter could be represented by the width of the display line representing the yarn. In that case, each length of yarn would be allotted more than one raster scan line to allow for variations in width to be displayed.

The system could also be enabled to store and display next to the image of the measured yarn images of standard yarns in a similar manner to the standard yarn image photograph used in the ASTM standard. This would allow the operator in a single screen to compare the electronically-imaged yarn length to standard yarns to determine the yarn grade. Fault values for standard yarns can also be stored in the computer to automate the comparison procedure.

Some of the system variables that may be established by the operator for the system of this invention include the yarn speed through the measurement zone, the number of diameter measurements or scans per millimeter, the size of the image, the image aspect ratio, the light source intensity relative to threshold, the display size, and the yarn diameter ranges to be assigned to different attribute values.

Threshold values can be determined for the different yarn qualities, and the measured qualities can be compared to those thresholds for finding faults or other events such as desired yarn effects. For example, a display attribute could be assigned based on the length of an event as well as the diameter; diameters of more than or less than a certain size which are present for more than or less than a certain length could be assigned one color or grey scale value so that the system would in effect ignore thick or thin areas that were shorter or longer than a decided length to allow only certain events to be displayed. More than one such type of event could be measured and displayed. An example of this could be accomplished by establishing a yarn width threshold and comparing the measured diameters to that threshold. A yarn length threshold would also be established. An event would then be defined as a portion in which the yarn width exceeds the width threshold for at least a length equal to the length threshold. In this case, the actual length of the event may be determined or not. If it is, the length of the display line segment could be made proportional to the actual length of the event so that the display represented more exactly the actual appearance of the yarn.

As described above, to facilitate operator recognition of a regularly-spaced fault, events could be displayed as short line segments, with no display for the yarn portions between events. This creates a series of horizontal line segments on the CRT, and regular events are immediately recognized by patterns in the line segment display. The lengths of these line segments are preferably user-definable. The line segments will typically be short segments of constant length, or segments whose length is directly related to the actual length of the event.

Events such as these could in any case be automatically counted and classified based on the representation attribute. Multiple events could be predefined by the operator using one or more thresholds for the measured quality or qualities. These events can then be displayed in different fashions to allow the operator to grade the yarn. The events can also be automatically counted and tabulated by the system. The system can be programmed to count events such as numbers of a certain grey or color scale values as they occur in a given screen (board) display to produce quantitative measurements of yarn appearance. Multiple thresholds can be established and used to count different events.

Therefore, although specific features of the invention are shown in some drawings and not others, this is for convenience only as some feature may be combined with any or all of the other features in accordance with the invention.

And, other embodiments will occur to those skilled in the art and are within the following claims:

What is claimed is:

1. A system for electronically displaying at least one yarn quality which has been measured by means for measuring at a plurality of locations along a length of yarn, comprising:

means for assigning a display attribute to each measured quality;

means for dividing the display attributes into a number of groups, each representing a portion of the length of yarn; and means for displaying the display attributes of the groups side-by-side to facilitate comparison of the quality in the groups.

2. The system of claim 1 further including a video display for displaying the display attributes.

3. The system of claim 1 in which the display attribute is a line segment.

4. The system of claim 1 in which the display attribute is color.

5. The system of claim 1 in which the display attribute is grey scale.

6. The system of claim 1 in which the display attribute is a display symbol.

7. The system of claim 1 further including means for establishing a quality threshold to which the quality measurements may be compared.

8. The system of claim 1 in which the measured yarn quality is diameter, and further including means for establishing a yarn width threshold, and comparing the diameters to that threshold.

9. The system of claim 8 further including means for establishing a yarn length threshold, and means for establishing an event when the yarn width is greater than or less than the width threshold for a length of more than or less than the length threshold.

10. The system of claim 9 in which the display attribute is a life segment displayed for events.

11. The system of claim 9 further including means for determining the lengths of yarn sub-portions in which the yarn width exceeds the width threshold as long as the length is at least equal to the length threshold.

12. The system of claim 11 in which said means for displaying includes means for creating a displayed line segment for the yarn sub-portions, in which the segment lengths are proportional to the sub-portion lengths.

13. The system of claim 1 further including means for counting the number of display attributes.

14. The system of claim 1 in which said means for measuring measures at least two different yarn qualities.

15. The system of claim 14 in which said means for assigning includes means for providing a different display attribute for each measured yarn quality.

16. A method of displaying at least one yarn quality which has been measured at a plurality of locations along a length of yarn, comprising:
    assigning a display attribute to each measured quality;
    dividing the display attributes into a number of groups each representing a portion of the length of yarn; and
    displaying the display attributes of the groups side-by-side to facilitate comparison of the quality in the groups.

* * * * *